(12) United States Patent
Knudsen

(10) Patent No.: US 7,390,958 B2
(45) Date of Patent: Jun. 24, 2008

(54) METHOD FOR TEACHING MUSIC

(75) Inventor: Craig Knudsen, Buena Park, CA (US)

(73) Assignee: Yamaha Corporation, Hamamatsu-Shi (JP)

( * ) Notice: Subject to any disclaimer, the term of this patent is extended or adjusted under 35 U.S.C. 154(b) by 471 days.

(21) Appl. No.: 10/877,214

(22) Filed: Jun. 25, 2004

(65) Prior Publication Data

US 2005/0005761 A1   Jan. 13, 2005

Related U.S. Application Data

(60) Provisional application No. 60/482,353, filed on Jun. 25, 2003.

(51) Int. Cl.
*G10H 7/00* (2006.01)
*A63J 17/00* (2006.01)

(52) U.S. Cl. ........................................ 84/645; 84/464 A

(58) Field of Classification Search ............... 84/464 R, 84/464 A, 477 R, 478, 645
See application file for complete search history.

(56) References Cited

U.S. PATENT DOCUMENTS

| | | | |
|---|---|---|---|
| 1,613,400 A | | 1/1927 | McAleavey |
| 5,048,914 A | * | 9/1991 | Sneddon ........................ 385/53 |
| 5,266,735 A | * | 11/1993 | Shaffer et al. .................. 84/609 |
| 5,394,784 A | * | 3/1995 | Pierce et al. ............... 84/464 A |
| 5,408,914 A | * | 4/1995 | Breitweiser et al. ....... 84/477 R |
| 5,886,273 A | | 3/1999 | Haruyama |
| 5,902,948 A | | 5/1999 | Haruyama |
| 6,011,210 A | | 1/2000 | Haruyama |
| 6,025,550 A | * | 2/2000 | Kato .......................... 84/464 A |
| 6,211,452 B1 | | 4/2001 | Haruyama |
| 6,337,433 B1 | | 1/2002 | Nishimoto |
| 6,342,663 B1 | * | 1/2002 | Kato .......................... 84/470 R |
| 6,417,438 B1 | | 7/2002 | Haruyama |
| 6,452,081 B1 | * | 9/2002 | Ravagni et al. ........... 84/477 R |
| 6,751,439 B2 | * | 6/2004 | Tice et al. .................... 434/350 |

FOREIGN PATENT DOCUMENTS

EP           0935234           8/1999

OTHER PUBLICATIONS www.thevisualixer.com, Key/Note Visualizer Model V9000ex, SCI Music Products, printed from website advertisement on Jun. 4, 2003 (4 pages).
"MIDI Overview", WEB.ARCHIVE.ORG, Dec. 22, 1997, pp. 1-6.

* cited by examiner

*Primary Examiner*—Jeffrey Donels
(74) *Attorney, Agent, or Firm*—Morrison & Foerster LLP

(57) ABSTRACT

One embodiment of the present invention relates to a method for teaching music to one or more students. The instructor's manual operation of a musical instrument controls in real-time the illumination of guide lamps on each student's musical instrument. This allows the students to visually connect the note to be played with the instructor's verbal instruction and then play the visually indicated note without having to look up at the instructor or a distant display. In another embodiment, the instructor's manual operation of his musical instrument provides a score display of the played note on each student's musical instrument. The students can visually connect the played note with the musical notation on the score display. Remote teaching over a communication network is also described as well as a removable interface for the musical instrument to assist in teaching and use of the instrument.

12 Claims, 4 Drawing Sheets

METHOD FOR TEACHING MUSIC

BACKGROUND OF THE INVENTION

1. Field of the Invention

The present invention relates to a method for teaching music to a student or a group of students. More particularly, the present invention relates to a teaching method in which an instructor's manual operation of a musical instrument controls the illumination of guide lamps and a musical score display on each student's musical instrument. The instructor can visually indicate notes to the students or even guide the students through a musical performance.

2. Description of the Related Art

Learning music can be demanding for a beginning student. He must not only learn the language of music (treble clef, C note, etc.), but how the language relates to the instrument that he has chosen. For example, if the student has chosen to learn music on a keyboard instrument, he must learn the relationship between the notes to be played and the keys on the keyboard. To achieve this level of understanding can be very daunting and time-consuming. Furthermore, if the student wishes to apply his understanding to play a musical performance, he must at a minimum learn which notes to play, when to play the notes and how long to hold the notes.

One conventional teaching method utilizes a musical instrument having a performance guidance function to instruct the player. In this method, the student selects stored data of a musical performance to be played on the instrument. If the instrument is a keyboard instrument, the performance guidance function of the instrument indicates which keys are to be operated, thereby guiding the student through the performance.

The keys to be operated can be indicated by a row of light emitting diodes (LEDs) or guide lamps arranged adjacent to the keys of the keyboard. Each guide lamp corresponds to a given key. As the musical performance to be played progresses, the guide lamps corresponding to the notes to be played are sequentially illuminated. The sequential illumination of the guide lamps informs the student which notes to play, when to play the notes and how long to hold the notes. Some instruments, such as disclosed in U.S. Pat. No. 6,337,433, further indicate which finger of which hand should be used to operate a designated key.

The keys to be operated can also be indicated through a liquid crystal display (LCD) placed adjacent to the keys. The display can display a score of the musical performance or, alternatively, a drawing of the keyboard as disclosed in U.S. Pat. No. 5,886,273. The drawing highlights the keys to be depressed during the musical performance. A scrolling function allows the student to know when to depress and release the keys as the performance proceeds.

Although performance guidance functions such as guide lamps and a score display can teach a student to play a musical performance, the teaching method is limited to individual instruction by following guide lamps which are illuminated under control of stored performance data. The student teaches himself or herself to play the musical performance by following the automated guide lamps or the score display. The teaching method does not involve teaching by a human instructor, but instead replaces the instructor.

A conventional method that allows for teaching a group of students is disclosed at www.thevisualizer.com. The method involves the use of a large display device with a connection to a MIDI keyboard instrument. The display device displays a portion of a keyboard and a score and can be placed in front of a class of students by the teacher. When the teacher plays a note, the display device indicates the played note by highlighting in some manner the key corresponding to the note and indicating the note on the score display. The students must look at the display device and then look down at their respective keyboards to depress the key indicated by the display device. Although such a display is useful to provide an indicator of keys to be depressed, it is difficult to look up at the display and then look down at the keyboard to play a note, repeat the process for the next note and so on.

Thus, the conventional method utilizing instruments with a performance guidance function is based on automated self-instruction and precludes teaching by a human instructor, while the conventional method for group teaching is cumbersome.

BRIEF SUMMARY OF THE INVENTION

It is an object of the present invention to provide a method for teaching music by a human instructor to a student or a group of students by means of a display device associated with each student's instrument.

A first embodiment of the teaching method is directed to group instruction of one or more students. In this embodiment, the instructor's manual operation of a musical instrument controls in real-time the illumination of guide lamps on each student's musical instrument. Specifically, as the instructor plays a note, MIDI data comprising light or lamp control data, as opposed to note playing data, is transmitted to the students' musical instruments. The lamp control data drives the guide lamps on each student's instrument to visually indicate the played note, but without generating a tone at the student's instrument. This allows the students to visually connect the note to be played with the instructor's verbal instruction and then play the visually indicated note without having to look up at the instructor or a distant display.

An aspect of the first embodiment allows musical score information to be displayed in real-time on each student's musical instrument. Specifically, the instructor's manual operation of his musical instrument not only controls in real-time the illumination of guide lamps corresponding to the played note, but also provides a score display of the played note on each student's musical instrument. The students can visually connect the played note with the musical notation on the score display. Because the score display is on each student's musical instrument, the student does not have to divert attention from the instrument to look at a display device in the front of the classroom.

Yet another aspect of the first embodiment allows an instructor to lead a student or a group of students based on performance data stored on an external or internal storage device associated with the instructor's musical instrument, by using the guide lamps of each student's musical instrument and by controlling the progression of the stored performance data. A storage medium with stored MIDI data is inserted in the instructor's musical instrument. The stored MIDI data drives guide lamps corresponding to notes of the performance data to blink on the instructor's musical instrument as well as the students' musical instruments. The blinking guide lamp notifies each student of the notes to be played.

When the instructor plays the note indicated by the guide lamp on his musical instrument, the note is sounded by the instructor's instrument and the guide lamp corresponding to the note on each student's musical instrument is changed from the blinking light to a solid light. The students cause notes to be sounded at their keyboards by depressing a key in the normal fashion, so as to follow and join the performance of the instructor. If the stored MIDI data includes automatic accompaniment data for the played note, accompaniment music is also played. The stored MIDI data then drives a guide lamp corresponding to the next note to blink on all of the musical instruments. In this manner, stored MIDI data can be used to illuminate the guide lamps of each student's musical instrument and possibly provide accompaniment, but the progression of the guide lamp illumination is controlled by the instructor in real-time. This allows the instructor to guide a student or group of students note-by-note. Even a large group of students can play a song in unison.

It should be noted that this aspect of the first embodiment particularly opens up new group music making possibilities other than simply learning a musical performance or song. Because the instructor is also instructed with the guide lamps, the instructor does not have to be a skilled player. He can simply be a facilitator that leads a group of players in music making.

A second embodiment of the present invention is directed to remote instruction via a communication network such as the Internet. In this embodiment, a instructor or a performer plays notes on a MIDI musical instrument connected to a communication network. Students are also connected to the network through their respective musical instruments. As the instructor plays notes, MIDI data comprising lamp control data, as opposed to note playing data, is transmitted to the students' musical instruments over the communication network. The lamp control data drives the guide lamps on each student's instrument to visually indicate the played notes while not causing generation of tones. The students can then play the visually indicated note and generate a tone.

The second embodiment can further be utilized with stored MIDI data and/or a score display as discussed above with respect to the first embodiment.

Yet another embodiment of the present invention is directed to an interface for a panel of an electronic musical instrument and a method of instruction using the interface. The panel of an electronic musical instrument has many panel members which can be very intimidating and difficult to understand for a beginning player. Certain types of players, such as younger players or seniors, may even have further difficulties with the panel. The panel may have difficult to understand terms or use small-size fonts.

An embodiment of the present invention is directed to placing a removable interface on the panel. The interface renames certain of the panel members and hides other panel members. Color coding is used to cluster a group of keys have similar functions. The color coding may also be used on the LCD panel to tie a cluster of panel members to a specific section of the LCD panel. In this manner, the interface can be used to instruct a group of students or players. The interface can also be used in conjunction with the first and second embodiments discussed above.

These and other features and advantages of embodiments of the present invention will be apparent to those skilled in the art from the following detailed description of the embodiments of the invention, when read with the drawings and any appended claims.

DETAILED DESCRIPTION OF THE INVENTION

In the following description of preferred embodiments, reference is made to accompanying drawings which form a part hereof and in which is shown by way of illustration specific embodiments in which the invention may be practiced. It is to be understood that other embodiments may be utilized and structural changes may be made without departing from the scope of the preferred embodiments of the present invention.

It should be also understood that in the following description the instructor need not necessarily be a skilled musical teacher or performer. The present invention is well-suited to either a skilled or an unskilled player as the instructor, because the instructor can be guided through the guide lamps and score display as well. Such an instructor can simply act as a facilitator for group playing.

Figure 1:
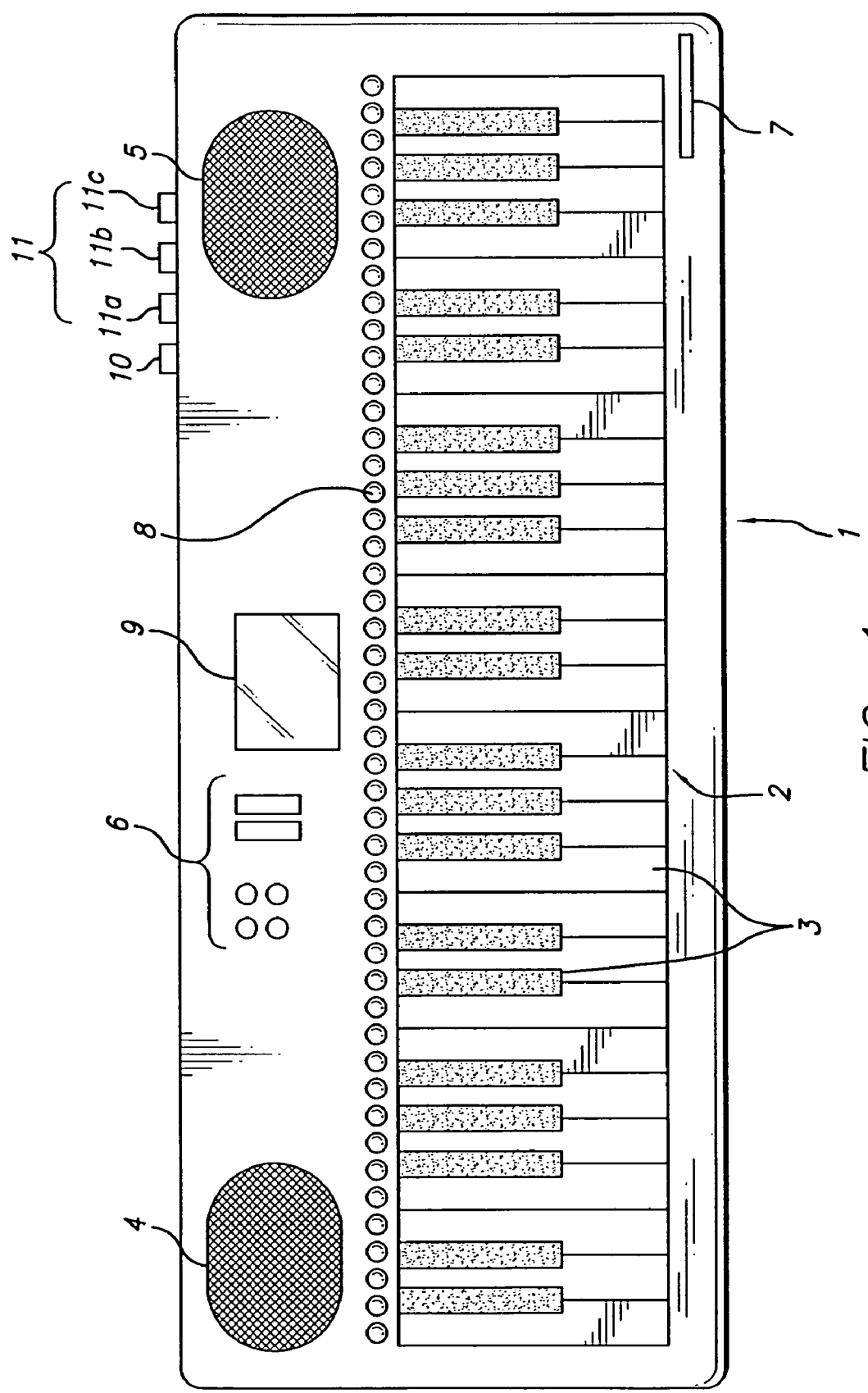
FIG. 1 is a plan view of a musical instrument to be utilized in the embodiments of the present invention.

FIG. 1 illustrates an electronic musical instrument 1 to be utilized in the embodiments of the present invention. The electronic musical instrument 1 includes a keyboard 2 with a plurality of operating elements or keys 3. Although an electronic keyboard instrument is illustrated in FIG. 1, the present invention is applicable with any other kind of electronic musical instrument, such as an electronic stringed instrument, as well as non-electronic musical instruments with MIDI input and output.

The keys 3 of the electronic musical instrument 1 designate the pitch of each tone to be generated. When a given key is depressed, a depressed key detection circuit (not shown in FIG. 1) outputs key-on event data upon detection of the depressed key, a key code indicative of the pitch of the depressed key and key-off event data upon release of the key. On the basis of performance data, a tone source circuit (not shown) generates a plurality of tone signals. The tone signals are audibly reproduced through a digital-to-analog converter and a sound system including speakers 4, 5. In this manner, a musical performance can be executed by a player through manual operation of the keys 3 of the keyboard 2.

The electronic musical instrument further includes a plurality of panel switches 6 for inputting various kinds of information. The panel switches 6 may include tone color setting switches, numeric keypads for setting values, increment/decrement switches, automatic performance start/end switch, overall system setting switches and a performance guide function ON/OFF switch.

The electronic musical instrument 1 also includes a storage device 7 for external storage media. The storage device 7 may be external to the electronic musical instrument 1 or internal as illustrated. The storage device 7 may be any one of a number of conventional storage devices, such as a floppy disk device (as shown), a compact-disk read-only memory (CD-ROM) device, a magneto-optical (MO) disk drive, a digital versatile disk (DVD) drive or a flash memory card drive for removable flash memory cards or sticks. Storage media in the storage device 7 can store various performance data corresponding to a predetermined musical performance.

The electronic musical instrument 1 has two display devices for guiding a musical performance. The first display device is a plurality of guide lamps 8. Each guide lamp 8 is adjacent to a corresponding key 3 of the keyboard 2 and includes an LED. Although a one-to-one correspondence between guide lamps and keys is illustrated in FIG. 1, the number of guide lamps may be varied. Once the performance guide function ON/OFF switch in the plurality of panel switches 6 is turned ON, the LEDs are controlled to emit light. A display circuit (not shown) functions to light the appropriate LED. An illuminated guide lamp informs the player to depress the key corresponding to the lamp. A player releases the depressed key when the guide lamp stops emitting light. In this manner, the guide lamps 8 guide a player through a performance of musical notes comprising a musical performance.

The second display device for guiding a musical performance is an LCD panel 9 placed adjacent to the keys 3 of the keyboard 2. The LCD panel 9 can display any number of graphical symbols for guiding performance. For example, the LCD can display a score of a musical performance as the music performance proceeds. It can also display an image of part or all of the keyboard 2. The keys of the displayed keyboard can be highlighted on the screen to guide the player through the performance. The LCD 9 can also display an image of both hands brought to the vicinity of the keys to be depressed with the fingers for depressing the keys highlighted. As with the guide lamps 8, a display circuit functions to display the images on the LCD 9.

The electronic musical instrument 1 includes a communication interface 10. The communication interface 10 can be connected to a communication network such as a LAN (local area network), the Internet or a telephone network. The communication network in turn is connected to a server computer, another electronic musical instrument or the like. Data from the server computer or the electronic musical instrument can be downloaded through the communication network to the electronic musical instrument 1 via the communication interface 10.

The electronic musical instrument 1 further includes a MIDI interface 11 which transmits and receives MIDI (Musical Instrument Digital Interface) messages to and from other MIDI devices. The MIDI interface includes three MIDI terminals 11a (MIDI IN), 11b (MIDI OUT) and 11c (MIDI THRU). MIDI IN terminal 11a receives MIDI messages from an external MIDI device such as a sequencer or another MIDI musical instrument. The MIDI OUT terminal 11b sends out MIDI messages generated by the electronic musical instrument 1. The MIDI THRU terminal 11c relays the MIDI messages received at the MIDI IN terminal 11a unchanged.

The electronic musical instrument 1 through the MIDI IN terminal 11a can receive a performance data set comprising a plurality of tracks. Each track includes event data and timing data. The timing data indicates the timing to read out the event data. The event data includes key-on event data, key-off event data, system-exclusive data and the like. The key-on event data instructs to the electronic musical instrument 1 to begin sounding a note. The key-off event data instructs the electronic musical instrument to terminate sounding a note with or without a decay.

The system exclusive (SysEx) event data or message is used when information other than performance information is transferred in the MIDI format, such as data unique to each manufacturer. For the electronic musical instrument 1 to receive a SysEx message, a SysEx receive switch from the panel switches 6 must be turned ON. When the SysEx receive switch is turned ON, the electronic musical instrument 1 can receive SysEx messages generated by an external source.

A SysEx message can be used to control the illumination of the guide lamps 8 of the electronic musical instrument 1. Yamaha's Clavinova line of pianos has the following SysEx messages for controlling the illumination of guide lamps: (1) Key LED Mode OFF and notes sound, (2) Key LED Mode ON and no notes sound or (3) Key LED Mode ON and notes sound. If the message is Key LED Mode OFF and notes sound, the LEDs of the guide lamps 8 will not emit light, but the key-on event data from the external source will instruct the electronic musical instrument 1 to generate a tone corresponding to the key-on event data. If the message is Key LED Mode On and no notes sound, the LEDs will emit light. The key-on event data from the external device triggers the corresponding LED to emit light, but it will not instruct the electronic musical instrument 1 to generate a tone. If the message is Key LED Mode On and notes sound, the LEDs of the guide lamps 8 will emit light and the electronic musical instrument 1 will be instructed to generate tones by the external device.

These SysEx messages have been previously used in conjunction with external sequencers to demonstrate the performance guidance function of an electronic keyboard instrument, for example in a retail store. The sequencer is connected to the electronic keyboard instrument in order to supply MIDI data for automatic performance by the instrument. The sequencer generates the Key LED Mode ON messages to illustrate the sequential lighting of the guide lamps during the automatic performance so that customers can visualize the keys which correspond to the performance.

Figure 2:
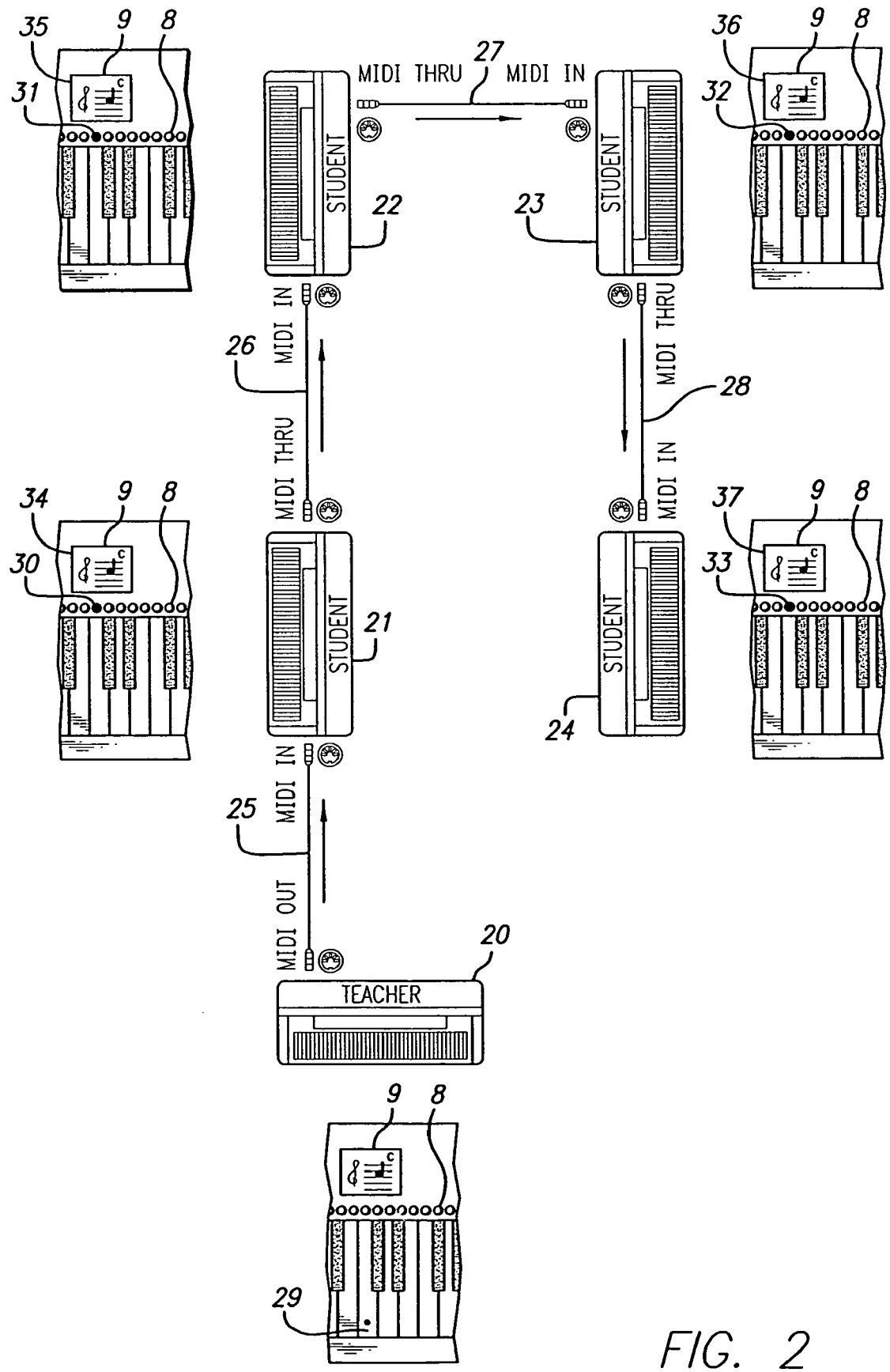
FIG. 2 is a schematic drawing of a network of musical instruments of FIG. 1 with a partial detailed view of the panel and keyboard for each musical instrument in the network.

To implement the embodiments of the present invention, the electronic musical instrument of FIG. 1 is placed in a network with other electronic musical instruments. FIG. 2 illustrates one configuration of the network with electronic musical instruments 20, 21, 22, 23 and 24. Although electronic musical instruments 20, 21, 22, 23 and 24 are identical, the network can comprise different types of musical instruments. Furthermore, the number of electronic musical instruments can vary from the five instruments illustrated in FIG. 2.

The configuration of the network in FIG. 2 is a MIDI daisy chain. A MIDI daisy chain is a series of one-way connections. Specifically, the MIDI OUT terminal of electronic musical instrument 20 is connected to the MIDI IN terminal of electronic musical instrument 21 through MIDI cable 25. The MIDI THRU terminal of electronic musical instrument 21 is in turn connected to the MIDI IN terminal of the electronic musical instrument 22 through MIDI cable 26. Electronic musical instruments 23 and 24 are connected to electronic musical instruments 22 and 23 respectively in the same manner through MIDI cables 27 and 28 as illustrated in FIG. 2.

In the illustrated MIDI daisy chain network, the electronic musical instrument 20 controls all the other electronic musical instruments 21, 22, 23 and 24. For example, a key pressed on electronic musical instrument 20 will cause all of the other electronic musical instruments 21, 22, 23 and 24 to sound the tone corresponding to the depressed key. The flow of MIDI data from electronic musical instrument 20 to the other electronic musical instruments 21, 22, 23 and 24 is indicated by the arrows adjacent to MIDI cables 25, 26, 27 and 28 in FIG. 2. Pressing a key on any of the other electronic musical instruments 21, 22, 23 and 24 will only generate a tone in the electronic musical instrument in which the key was pressed, because the output is only data passed through the instrument and not data originated at the instrument.

The daisy chain network of electronic musical instruments in FIG. 2 can be used to implement the first embodiment of the present invention for group instruction. Electronic musical instrument 20 is played by an instructor while electronic musical instruments 21, 22, 23 and 24 are played by students. The instructor depresses a key on his electronic musical instrument. This is indicated in FIG. 2 by the partial detailed view of the panel and keyboard of electronic musical instrument 20. The black dot on key 29 indicates that the instructor has played note C. Of course, more than one key at a time can be depressed in the present embodiment.

The instructor's key depression produces lamp control data that illuminates in real-time the guide lamps 8 of each student's electronic musical instrument. This is achieved through a preparatory SysEx message. Specifically, prior to instruction, a facilitator disk is inserted in the storage device 7 of the instructor's electronic musical instrument. The disk includes a MIDI file with a preparatory SysEx message. If the data of the message is "Key LED Mode ON and no notes sound," the LED(s) of each of the students' electronic musical instruments 21, 22, 23 and 24 corresponding to depressed key 29 will be lit. This is illustrated in FIG. 2 by the partial detailed view of the keyboard and panel for each student's electronic musical instrument. Guide lamps 30, 31, 32 and 33 corresponding to depressed key 29 of the instructor's electronic musical instrument 20 are lit (illustrated as a dark guide lamp). The guide lamps will remain illuminated until the instructor releases key 29.

The illumination of guide lamps 30, 31, 32 and 33 provides a visual connection between the note to be played and the instructor's verbal instruction. For example, the instructor can utilize the real-time illumination of the guide lamps 30, 31, 32 and 33 to orient the students to the keys of the keyboard. The instructor can also utilize the real-time illumination to explain the relationship between the language of music (e.g., the name of the note) and the corresponding key of the keyboard.

The illuminated guide lamps also provide a visual indication for each student to play the key corresponding to the illuminated guide lamp without each student having to look up at the instructor. Furthermore, unlike a standard MIDI performance message, the SysEx message will instruct electronic musical instruments 21, 22, 23 and 24 to not generate a tone corresponding to depressed key 29. Instead, each student can depress the key corresponding to the illuminated guide lamp to play the note and independently generate a tone in a normal fashion. In other words, the MIDI data supplied to electronic musical instruments 21, 22, 23 and 24 are used to provide instruction but not note generation.

After the students have correctly depressed the key corresponding to the illuminated guide lamp, the instructor can depress another key. This key can correspond to the next note of a musical performance. The instructor's manual operation drives the guide lamps of each student's electronic musical instrument corresponding to the newly depressed key. In this manner, the instructor can teach a musical performance to a student or an entire group of students through the use of guide lamps of their respective instruments.

It should be noted that SysEx messages other than Key LED Mode ON and no notes sound exist. For example, the SysEx message Key LED Mode ON and notes sound would cause LEDs to light and tones to be sounded at the students' instruments. The SysEx message Key LED Mode OFF and note sound would cause notes to be sounded in a conventional manner without lighting of LEDs. These messages are not particularly useful for instruction.

However, there may be instances where the instructor wants to give instruction by playing notes without the guides lamps being illuminated. If the instructor does not want the LEDs to light on each student's instrument (or sound to be generated), he must detach the MIDI cables connecting his instrument to the students' instrument. A new SysEx message, Key LED Mode OFF and no notes sound, has been defined overcome this disadvantage. The new message turns off the LEDs at each student's electronic musical instrument without the instructor having to detach any MIDI cables, such that there will be no response of any kind at each student's instrument in response to key depression at the instructor's instrument. Thus, there are two desirable modes for instruction in relation to SysEx messages: 1) Key LED Mode On and no notes sound and 2) Key LED Mode OFF and no notes sound. The others are not generally desirable for instruction.

An aspect of the first embodiment further utilizes the LCD display on each student's musical instrument to instruct music notation to the students. The student can not only learn the relationship between the note name and the key to be played, but also the correct music notation for the note. Because the score display is provided on each student's musical instrument, the students do not have to look up at any display device in front of the classroom and divert attention from the electronic musical instrument.

This aspect of the first embodiment is also illustrated in FIG. 2. For this embodiment, a new SysEx message, Key LED Mode ON, no notes sound and jump to score, has been defined. When the instructor plays note C by depressing key 29, the guide lamp corresponding to the depressed key 29 on each student's musical instrument will be illuminated in the manner discussed above. The note name and musical notation corresponding to the depressed key 29 will also be displayed on each student's LCD display. FIG. 2 illustrates each student's musical display 34, 35, 36 and 37 showing a treble clef, with the note name (e.g., C note) and notation corresponding to the depressed key. The same image can also appear on the display of the teacher's musical instrument.

It should be noted that the musical score display does not have to be utilized in conjunction with the illumination of the guide lamps. A SysEx message can be defined to only "jump to score" and generate no sound and no LED illumination. Also, the LCD display may display images other than a musical score. For example, the LCD display can display an image of the keyboard and two hands. The displayed keyboard can visually indicate depressed key 29 and further indicate the correct finger to play the note.

The method of the first embodiment can be further applied with stored MIDI performance data such as has been previously utilized for self-instruction. As discussed in the Description of Related Art, performance guidance functions are typically utilized with stored MIDI performance data. The stored MIDI data is accessed by the electronic musical instrument, and the guide lamp for the first note of the performance is illuminated. If the player plays the note corresponding to the illuminated guide lamp, the note will sound and the guide lamp corresponding to the next note will be illuminated. Any accompaniment music associated with an instructed note will also be played upon key depression. That is, the automatic performance data of the accompaniment music waits until the proper note is played.

When stored MIDI data is used with the first embodiment, i.e., utilized by the instructor to guide a performance, the guide lamp corresponding to the first note to be played is illuminated on the instructor's musical instrument, but the corresponding guide lamps on the students' electronic musical instruments are not illuminated because MIDI out signals are only generated upon key depression. Only after the instructor plays the first instructed note will the guide lamp of each student's musical instrument be illuminated, as discussed above. The students thus receive the visual indication only after the note is played which is not ideal for following a performance. The students do not receive any visual indication of the note to be played prior to the instructor playing the note. Furthermore, if the played note triggers accompaniment music, the accompaniment music is played before the students play the illuminated note. Thus, the students do not get the benefit of hearing the accompaniment music as they play the note.

In yet another aspect of the first embodiment, the stored MIDI performance data which instructs the next note or notes to be played is used to light not only the guide lamps of the instructor's electronic musical instrument, but also the guide lamps for each student's electronic musical instrument before the note is to be played. Furthermore, the instructor can control the progression of the guide lamp illumination and the performance in real-time. In this manner, the instructor can guide the students through, for example, a musical performance, and the students can receive the benefit of playing essentially simultaneously with the instructor and hearing the accompaniment music as they play the notes of the performance.

For this aspect of the first embodiment to be implemented, the instructor inserts a storage media containing MIDI data of a musical performance in the storage device 7 of the instructor's electronic musical instrument. Alternatively, the MIDI data can be stored in a memory of the electronic musical instrument. The MIDI data for illuminating the guide lamps is on a given channel or track called the guide track. The data on the guide track is duplicated to another MIDI channel or track by a sequencer or similar device. The data on the new track is adjusted such that the guide lamps will blink for every note on the new track. This can be achieved by assigning a value of 1 for the velocity of every note on the track. Both of these tracks will be received by each student's electronic musical instrument to drive the guide lamps. The new track will provide the lighting before the instructor plays a given note, and the instructor's playing of the note will light the guide lamps of each student's instrument as discussed below.

Specifically, when the new track of stored MIDI data is accessed by the electronic musical instrument, the guide lamp corresponding to the first note to be played blinks in all of the electronic musical instruments in a network such as in FIG. 2. Thus, the instructor and the students receive a visual indication of the note to be played. A student can play the indicated note at any time on his electronic musical instrument. However, only the instructor controls the progression of the performance and the illumination of the guide lamps. When the instructor plays the note indicated by the blinking guide lamp, the guide lamp corresponding to the played note will change from blinking to a solid light in each of the student's electronic musical instruments. This indicates to the student that the instructor has a played the note. The guide lamp corresponding to the next note to be played is then illuminated as a blinking light and any accompaniment music associated with the played note is played as well. In this manner, the students receive a visual indication of the notes to be played, but the instructor can control the progression of the musical performance and the illumination of the guide lamps in real-time, thereby guiding the students through the performance note-by-note.

The real-time instructor control of the progression of the musical performance as well as the illumination of guide lamps can be particularly useful for group teaching. For example, the instructor can first ascertain whether all the students are ready to play the correct note indicated by the blinking guide lamp. Once ascertained, the class can all then play the note corresponding to the blinking guide lamp at the same time. If the note is associated with accompaniment music, the entire class can hear the accompaniment music as they play the note. This instills positive reinforcement for the class.

Moreover, this aspect of the first embodiment can be particularly useful for unskilled instructors. The guides lamps are illuminated in a blinking manner not only on each student's electronic musical instrument, but also on the instructor's electronic musical instrument. The instructor thus does not have to have any musical training to lead the student or students. He can simply follow the blinking guide lamps at his discretion to facilitate group playing.

The MIDI daisy chain configuration of FIG. 2 is particularly economical, because it can be accomplished without any external hardware other than one MIDI cable for each student's electronic musical instrument. It should be noted that the MIDI daisy chain configuration among numerous instruments is not generally recommended for normal MIDI performance applications due to MIDI delay experienced between the instruments causing notes to be sounded at different times at the different instruments. However, the MIDI daisy chain configuration is acceptable, and preferred, for the embodiments of the present invention, because only lamp control data for instructing the player at each instrument is used.

Figure 3:
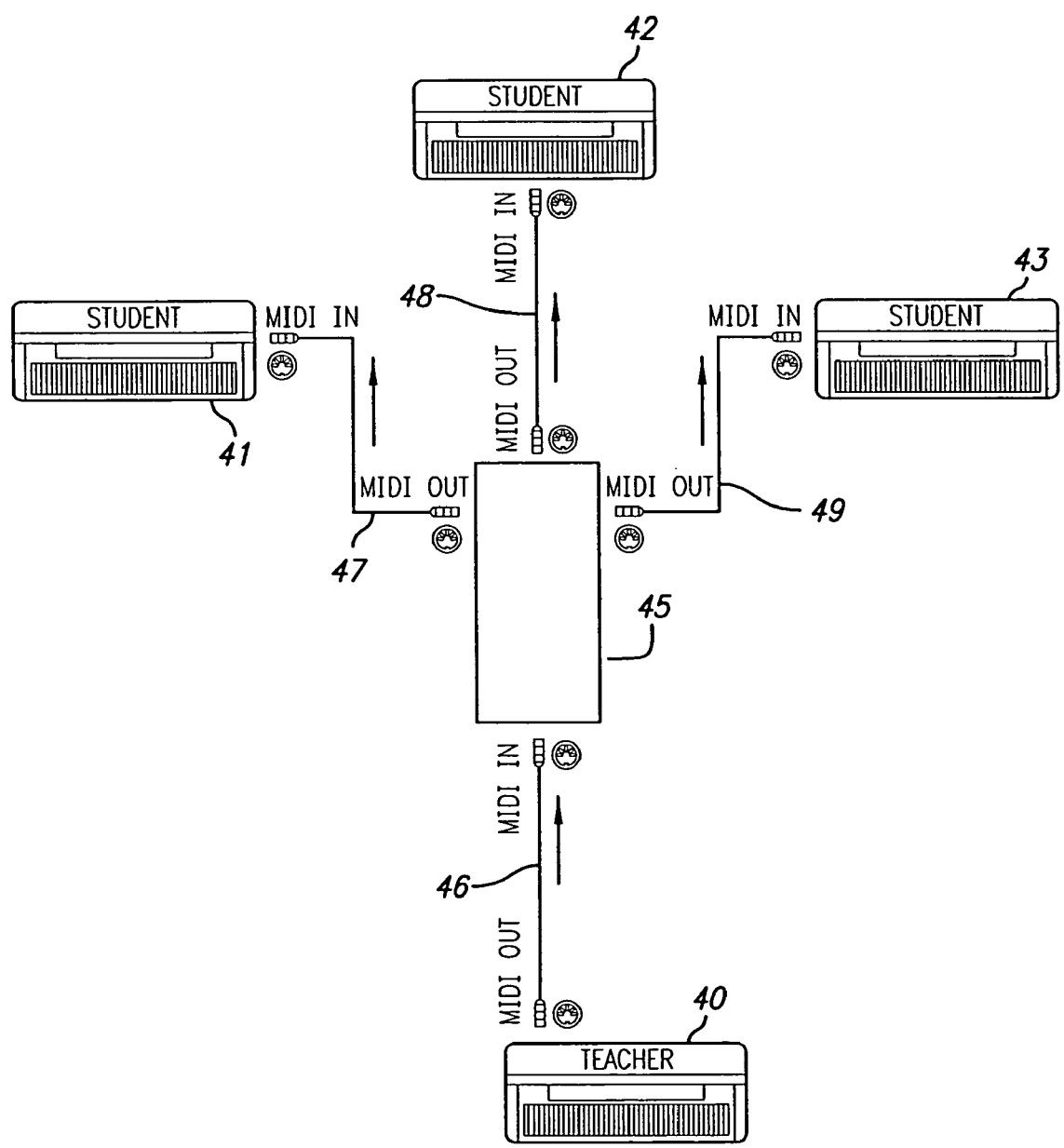
FIG. 3 is a schematic drawing of another network of musical instruments.

Network configurations other than the MIDI daisy chain can be used for the embodiments of the present invention. FIG. 3 illustrates a hub-and-spoke configuration. One advantage of this configuration is the elimination of any MIDI delay found in the MIDI daisy chain configuration. Electronic musical instrument 40, used by the instructor, is the hub in the configuration while electronic musical instruments 41, 42 and 43, used by the students, are the spokes in the configuration. The electronic musical instruments are connected through a controller, router or the like indicated by reference numeral 45. Specifically, the MIDI OUT terminal of electronic musical instrument 40 is connected to the MIDI IN terminal of controller 45 through MIDI cable 46. The controller 45 has a number of MIDI OUT terminals. Three of its MIDI OUT terminals are connected to the MIDI IN terminals of electronic musical instruments 41, 42 and 43 through cables 47, 48 and 49, respectively.

As in the MIDI daisy chain configuration of FIG. 2, the electronic musical instrument 40 in FIG. 3 controls all the other electronic musical instruments 41, 42 and 43. For example, a key pressed on electronic musical instrument 40 will cause all of the other electronic musical instruments 41, 42, and 43 to sound the tone corresponding to the depressed key. The flow of MIDI data from electronic musical instrument 40 to the other electronic musical instruments 41, 42 and 43 is indicated by the arrows adjacent to MIDI cables 46, 47, 48 and 49 in FIG. 3. It should be noted that the configuration of FIG. 3 is not the preferred due to the additional hardware (e.g., controller 45) that is needed to implement the configuration.

A second embodiment of the present invention is directed to remote instruction of a student or a group of students via a communication network such as the Internet. In this embodiment, an instructor plays notes on a musical instrument connected to the Internet. Students, at different locations, are also connected to the Internet through communication interface 6 of their respective musical instruments. Some of the students may be connected to the Internet through a computer coupled to their respective electronic musical instruments.

MIDI data is sent from the instructor's electronic musical instrument through the Internet and is received by each student's electronic musical instrument or computer. The MIDI data comprises the data to perform the instruction methods discussed above. For example, as the instructor plays a note, MIDI data comprising lamp control data, as opposed to note playing data, is transmitted to the students' musical instruments over the Internet. The lamp control data drives the guide lamps on each student's instrument to visually indicate the played note, but without generating a tone at the student's instrument. The students can then play the visually indicated note and generate a tone. Furthermore, the MIDI data may comprise data for controlling the score display to provide musical notation of the played notes. The second embodiment can also be utilized with stored performance data as discussed above with respect to the first embodiment.

It should be noted that other data may be sent in conjunction with the MIDI data over the Internet. For example, streaming video data may be sent in conjunction with the MIDI data to provide a real-time image of the performer on the computer monitors of the students or possibly on the LCD panel 9 of the electronic musical instruments. Such data with the MIDI data provides a visual context for the remote instruction.

Although the second embodiment has been described with the Internet as the communication network, other networks may be used. The communication network may be a wireless communication network, a public telephone line network, a LAN or the like. In the case of a wireless communication network, the electronic musical instrument's communication interface sends and receives electrical, electromagnetic or optical signals carrying data, such as the lamp control data.

The embodiments of the present invention have been described with a instructor teaching a student or a group of students. The group, however, does not have to be made of an teacher with students, a performer with fans or a virtuoso master with apprentices. The embodiments of the present invention open up new group music possibilities that go beyond instructional settings.

For example, the embodiments of the present invention can be applied in a hospital setting. A group of patients can be led by a unskilled hospital staff person to promote wellness or healing. The embodiments of the present invention can also be applied in a retirement community setting. A facilitator in a retirement community (such as a staff person or even one of the retirees) can lead a group of retirees through a musical program designed to improve the retirees' quality of life. The embodiments of the present invention can even be applied, through a communication network, in the homes of a group of friends who want to learn to play music. For example, each week, one friend can act as a facilitator by leading the group through a musical performance.

It should be noted that these group music possibilities are not limited to learning a musical performance. Such programs may be involve learning a few notes, using relaxation techniques with music or teaching young students to concentrate through the rewards of hearing tones generated by an instrument.

It should be noted that current electronic musical instruments have many features to enable music-making by individuals ranging from beginners to virtuosos. As a result, the panel of an electronic musical instrument may contain a number of different switches, buttons, knobs and the like. If the user is an unskilled player or a beginner as discussed above, the panel may be intimidating with many different panel members (especially those not intended for his use). However, to change the panel configuration for each group of players can be very time-consuming and expensive.

Figure 4:
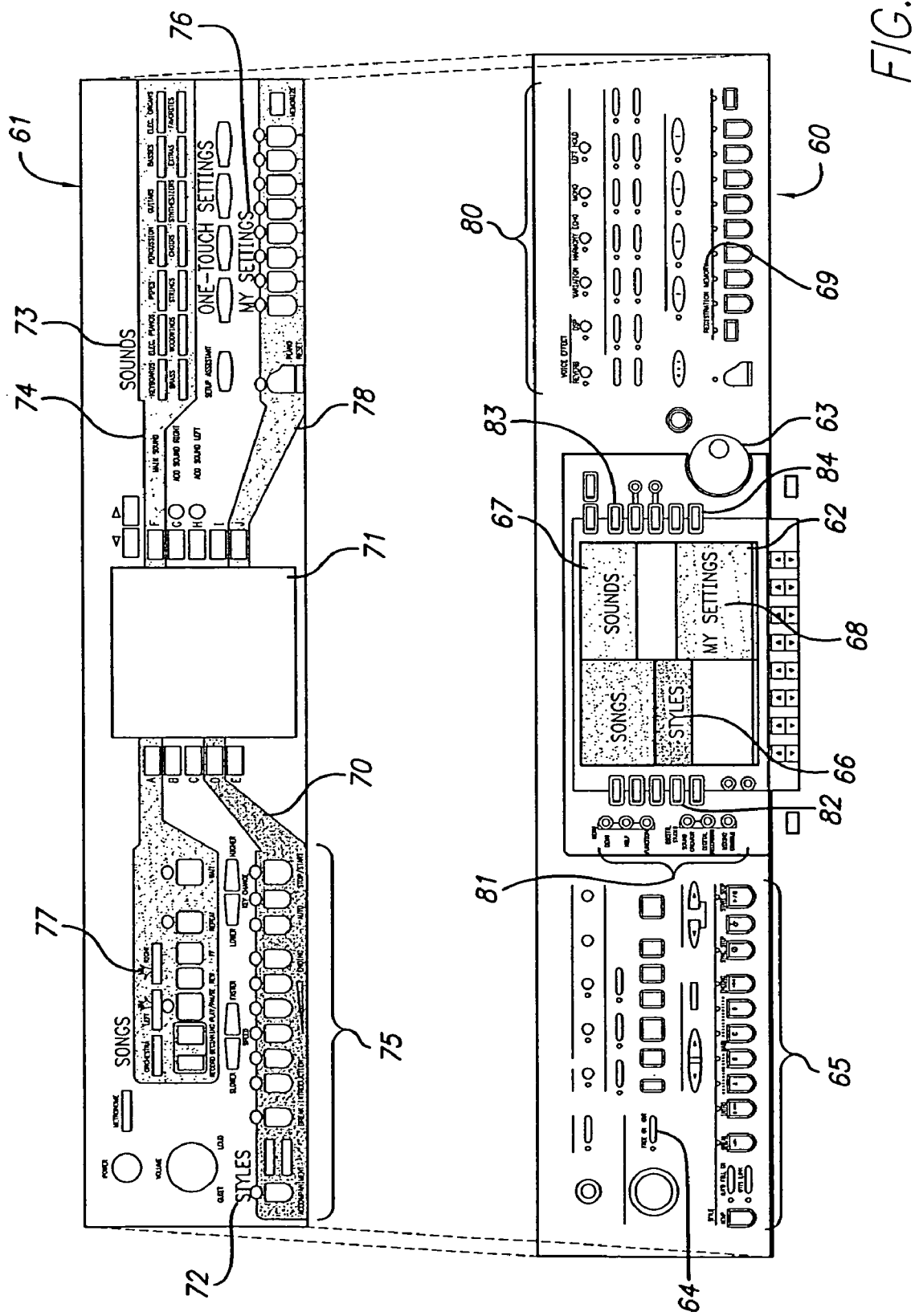
FIG. 4 is a plan view of a panel interface to be placed on top of a panel of a musical instrument in accordance with an embodiment of the present invention.

FIG. 4 illustrates an embodiment of the present invention for electronic keyboard instruments (although the present invention is applicable to other types of musical instruments). Panel 60 is a panel of an electronic keyboard musical instrument, and interface 61 is designed to be placed on the panel as indicated by the dotted lines in FIG. 4. The panel 60 includes a LCD panel 62, a data wheel or knob 63 for controlling information on the LCD panel 62 and a fade in/out button 64. Control section 65 refers to a group of buttons relating to choosing a style (e.g., pop, Jazz, Latin) for auto accompaniment. Reference numeral 80 refers to a group of buttons relating to voice effect, such as reverb, variation and harmony echo. Reference numeral 81 refers to a group of buttons relating to the menu (demo, help, function) and digital studio (sound creator, digital recording and mixing console).

The LCD panel 62 includes various sections 66, 67 and 68 providing information relating to corresponding switches, buttons, knobs and the like. For example, section 66 relates to the style for the auto accompaniment as controlled by control section 65. The panel 60 also includes writing to explain the panel members. For example, reference numeral 69 refers to "Registration Memory" for the group of buttons directly underneath it.

The interface 61, which can be made of plastic, is placed over panel 60 and is removable. It features basic functions in an inviting, easily understood manner. The interface 61 has cut-outs for certain panel members. For example, cut-out 71 is designed to border the LCD 62. Other panel members are hidden by the interface 61 to simplify the panel 60. These panel members may refer to advance features or may be confusing to a beginner or unskilled player. For example, the interface 61 covers the data wheel 63 and the fade in/out button 64. It also covers the group of buttons relating to voice effect as indicated by reference numeral 80 and the group of buttons relating to the menu and digital studio as indicated by reference numeral 81. It should be noted that as the player proceeds through the learning process, sections of the interface 61 can be removed to show previously hidden panel members.

The interface 61 also clusters panel members having like functions through the use of color coding and easily understood terms or phrases. For example, control section 65 which controls the style for the auto accompaniment is simply renamed "STYLES" 72 in a large font and the entire group of buttons is surrounded by cut-outs 75 in a bright color 70 (indicating by the highlighting). Similarly, buttons relating to different sounds is named "SOUNDS" 73 and is surrounded by cut-outs in a different, bright color 74 (indicated by the different highlighting). The group of buttons relating to "Registration Memory" is in a yet another different color 78, and the phrase "Registration Memory" has been covered by the interface 61 and replaced with the easier-to-understand phrase "MY SETTINGS" 76. In this manner, an instructor can refer to a color section or a topic heading (e.g., STYLES) to orient the students to a given section of panel 60. The simple heading is also easier for the student to understand the function of the panel member or members.

Moreover, the color coding on interface 61 can be tied to the LCD panel 62. The color coding is extended from a given group of buttons to LCD panel display buttons for controlling the display. For example, the color coding 70 for the STYLES panel members is extended on the interface 61 to LCD panel display button 82. Similarly, the color coding 74 for the SOUNDS panel members and the color coding 78 for the MY SETTINGS panel members are extended to LCD panel display buttons 83 and 84 respectively.

The display buttons 82, 83 and 84 relate to sections 66, 67 and 68 of the LCD panel 61 that provide information relating to the group or cluster of panel members. These sections of the LCD panel can also be color coded. For example, section 66 can be the same color as the color 70 on the interface 61 for the STYLES panel members. Similarly, sections 67 and 68 can be the same color 74 and 78 on the interface 61 for the SOUNDS and MY SETTINGS panel members, respectively. By color coding a group or cluster of related buttons and then tying the group through color to a display button and a section of the LCD panel, a beginner can easily connect the related buttons to the information provided in the section of the LCD panel. Moreover, the instructor can easily orient the students to a section of the LCD panel by simply referring to the color. Aside from color coding, the LCD panel may also repeat heading names such as STYLES for even easier reference. It should be noted that different types of coding other than color coding may be used, such as hatching or texture coding.

The present invention can be modified depending on the age group of the students or the market. For example, for seniors, the font size of some of the headings can even be larger. Figures of objects can also be used to communicate the function of a panel member. For example, on the interface 61 in FIG. 4, a figure 77 of the right hand is used to communicate the function of the panel member. For young students, figures from cartoons, television shows and the like may used in conjunction with color coding, and more of the panel members may be hidden to focus young students on just a few panel members.

The present invention can also be used in conjunction with the first and second embodiments of the present invention. For example, the instructor can refer to the interface 61 to orient the students to panel before the performance. The teacher can then instruct the students to press certain buttons necessary for the performance. Some students can be directed through the interface 61 to provide a certain drum sound and other students can be directed to provide other sounds. Then, the instructor can use the first and second embodiments to lead the students through a performance that combines all the sounds.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by any appended claims.

What is claimed is:

1. A method for performing a musical performance, said method comprising:
    storing automatic performance data in a first electronic musical instrument;
    connecting the first electronic musical instrument to at least a second electronic musical instrument;
    a first step of providing a first visual indication for identifying notes on the first and second electronic musical instruments based on the stored automatic performance data, wherein the first visual indication is provided by a blinking indication;
    performing the note with the first electronic musical instrument;
    generating data corresponding to the note;
    transmitting the generated data to the second electronic musical instrument;
    a second step of providing a second visual indication on the second electronic musical instrument based on the generated data, wherein the second visual indication is provided by a steady indication; and
    performing the note on the second electronic musical instrument.

2. The method of claim 1 wherein said first step of providing a first visual indication comprises illuminating at least one lamp on the first and second electronic musical instruments based on the stored automatic performance data and said second step of providing a second visual indication comprises illuminating at least one lamp on the second electronic musical instrument based on the generated data.

3. The method of claim 1 wherein the stored data and the generated data are MIDI data.

4. The method of claim 1 wherein said first step of providing a first visual indication comprises displaying a musical score on the first and second electronic musical instruments based on the stored automatic performance data and said second step of providing a second visual indication comprises displaying a musical score on the second electronic musical instrument based on the generated data.

5. The method of claim 1 wherein the first and second electronic musical instruments are electronic keyboard musical instruments.

6. The method of claim 1 wherein said step of connecting comprises connecting the first electronic musical instrument to the second electronic musical instrument through a communication network.

7. The method of claim 6 wherein said communication network is the Internet.

8. The method of claim 1 further comprising generating accompaniment on the second electronic musical instrument based on the automatic performance data.

9. A method for learning music by using an electronic musical instrument, said method comprising:
    a first step of receiving, from another electronic musical instrument connected with the electronic musical instrument, event data for instructing to sound a note, which is generated on the another electronic musical instrument,
    a second step of generating a tone signal based on the received event data,
    a third step of receiving, from the another electronic musical instrument, first message for instructing visual guide mode ON and no notes sound or second message for instructing visual guide mode OFF and no notes sound,
    a fourth step of receiving, from the another electronic musical instrument, another event data for instructing to sound a note, which is generated on the another electronic musical instrument after receiving the first message or the second message in third step,
    a fifth step of, if the third step receives the first message from the another electronic musical instrument, controlling to provide a visual indication for identifying a note corresponding to the received another event data according to the first message and controlling to generate no tone signal based on the received another event data according to the first message, and
    a sixth step of, if the third step receives the second message from the another electronic musical instrument, controlling to provide no visual indication for identifying a note corresponding to the received another event data according to the second message and controlling to generate no tone signal based on the received another event data according to the second message.

10. The method of claim 9, wherein the electronic musical instrument is used by a student, wherein the another electronic musical instrument is used by a teacher.

11. An electronic musical instrument, the instrument comprising:
    receiving means for receiving, from another electronic musical instrument connected with the electronic musical instrument, event data for instructing to sound a note, which is generated on the another electronic musical instrument,
    tone generating means for generating a tone signal based on the received event data, and visual indication means for providing a visual indication for identifying a note, wherein the receiving means further receive, from the another electronic musical instrument, first message for instructing visual guide mode ON and no notes sound or second message for instructing visual guide mode OFF and no notes sound, and receive, from the another electronic musical instrument, another event data for instructing to sound a note, which is generated on the another electronic musical instrument after receiving the first message or the second message, wherein, if the receiving means receive the first message from the another electronic musical instrument, the visual indication means are controlled to provide a visual indication for identifying a note corresponding to the received another event data according to the first message and the tone generating means are controlled to generate no tone signal based on the received another event data according to the first message, wherein, if the receiving means receive the second message from the another electronic musical instrument, the visual indication means are controlled to provide no visual indication for identifying a note corresponding to the received another event data according to the second message and the tone generating means are controlled to generate no tone signal based on the received another event data according to the second message.

12. The method of claim 11, wherein the electronic musical instrument is used by a student, wherein the another electronic musical instrument is used by a teacher.

* * * * *